United States Patent [19]
Franke et al.

[11] Patent Number: 6,035,335
[45] Date of Patent: Mar. 7, 2000

[54] OPTIMISTIC, EAGER RENDEZVOUS TRANSMISSION SYSTEM AND COMBINED RENDEZVOUS SYSTEM FOR MESSAGE PROCESSING, AND RELATED DATA STRUCTURES

[75] Inventors: Hubertus Franke, Cortlandt Manor; Rama K. Govindaraju, Poughkeepsie; Pratap C. Pattnaik, Ossining, all of N.Y.; Mandayam T. Raghunath, Bangalore, India; Robert M. Straub, Poughkeepsie, N.Y.

[73] Assignee: International Business Machines Corporation, Armonk, N.Y.

[21] Appl. No.: 08/917,571

[22] Filed: Aug. 26, 1997

[51] Int. Cl.[7] ................................................ G06F 13/00
[52] U.S. Cl. ......................................................... 709/232
[58] Field of Search ................................. 709/200, 201, 709/203, 212, 213, 214, 217, 218, 219, 232, 233, 234

[56] References Cited

U.S. PATENT DOCUMENTS

| | | | |
|---|---|---|---|
| 4,910,733 | 3/1990 | Sommani et al. | 370/218 |
| 4,995,056 | 2/1991 | Fogg, Jr. et al. | 370/231 |
| 5,113,392 | 5/1992 | Takiyasu et al. | 370/473 |
| 5,313,582 | 5/1994 | Hendel et al. | 710/56 |
| 5,335,232 | 8/1994 | Suzuki et al. | 714/715 |
| 5,448,561 | 9/1995 | Kaiser et al. | 370/471 |
| 5,463,382 | 10/1995 | Nikas et al. | 340/825.44 |
| 5,539,465 | 7/1996 | Xu et al. | 348/388 |
| 5,577,211 | 11/1996 | Annapareddy et al. | 709/232 |
| 5,784,649 | 7/1998 | Begur et al. | 709/231 |
| 5,787,073 | 7/1998 | Ikeda | 370/236 |
| 5,812,775 | 9/1998 | Van Seters et al. | 709/213 |
| 5,878,226 | 3/1999 | Benner et al. | 709/233 |

*Primary Examiner*—Moustafa M. Meky
*Attorney, Agent, or Firm*—Heslin & Rothenberg, P.C.

[57] ABSTRACT

A method, system, and associated program code and data structures are provided for a message processing system in which messages are transmitted from source nodes to destination nodes. An "eager" rendezvous transmission mode is disclosed in which early arrival buffering is provided at message destination nodes for a predetermined amount of data for each of a predetermined number of incoming messages. Relying on the presence of the early arrival buffering at a message destination node, a message source node can send a corresponding amount of message data to the destination node along with control information in an initial transmission. Any remaining message data is sent only upon receipt by the source node of an acknowledgement from the destination node indicating that the destination node is prepared to receive any remaining data. In an enhanced embodiment, the source node alternates between rendezvous transmission modes as a function of the amount of free space in the early arrival buffering at the destination node, as indicated by the number of outstanding initial transmissions for which acknowledgements have not yet been received. Different transmission modes for different destination nodes can be employed at a source node, depending on the amount of early arrival buffering currently available in each respective destination node.

21 Claims, 5 Drawing Sheets

OPTIMISTIC, EAGER RENDEZVOUS TRANSMISSION SYSTEM AND COMBINED RENDEZVOUS SYSTEM FOR MESSAGE PROCESSING, AND RELATED DATA STRUCTURES

CROSS REFERENCE TO RELATED APPLICATIONS

This Application relates to the following commonly assigned, concurrently filed U.S. Patent Applications:

1. U.S. patent application Ser. No.: 08/918,390, entitled "OPTIMISTIC, EAGER RENDEZVOUS TRANSMISSION MODE AND COMBINED RENDEZVOUS MODES FOR MESSAGE PROCESSING SYSTEMS."

This Application is hereby incorporated by reference herein in its entirety.

TECHNICAL FIELD

This Application relates to message processing systems. More particularly, this Application relates to methods and systems, including protocols and buffering, for facilitating the transmission of messages from a source node to a destination node in a message processing system.

BACKGROUND OF THE INVENTION

Message processing systems, for example, the multiprocessor data processing system 10 depicted in FIG. 1, require reliable message communication paths between respective ones of the processors $12_1 \ldots 12_j$. The exemplary system 10 of FIG. 1 employs an exemplary communication medium or switch network 20 commonly coupled to the processors 12. The processors may require respective communication adapters $14_1 \ldots 14_j$ to control communications between each processor 12 and the medium 20 via respective connections $16_1 \ldots 16_j$. Communication between, for example, software application(s) executing on the processors 12 of system 10 can thus be provided via medium 20. Storage medium 22 may be employed in the system to hold the applications, associated data, etc.

Because respective processors may be supporting different, asynchronous application software partitions, asynchronous messaging becomes a useful form of communication between the processors. For example, messages may require transmission from a "source" node (e.g., processor $12_1$) to a "destination" node (e.g., processor $12_j$).

Random delays may be experienced in medium 20 by individual messages sent from a source node to a destination node, therefore, the destination node may be required to receive messages in an order different from the order in which they were transmitted from the source node. The destination node, to accommodate this requirement, may provide buffers to hold incoming, unordered messages. The messages can then be retrieved from the buffers and processed in their proper order. This is illustrated in FIG. 2, which is a hybrid hardware/software diagram of a message processing system like that of FIG. 1 and which depicts a message source node $18_1$ and a message destination node $18_j$. (The term "node" is used broadly herein to connote any identifiable combination of hardware and/or software to or from which messages are passed.) Source node $18_1$ has allocated therein send message buffers 30 within which are placed messages M(1), M(2) and M(3) which, for application reasons, are required to be sent through send message processing 32, across medium 20, to destination node $18_j$.

As discussed above, random delays in medium 20 may cause messages M(1), M(2) and M(3) to arrive at destination node $18_j$ out of order. To accommodate out of order receipt of messages, destination node $18_j$, in anticipation of the arrival of messages from various sources in the system, can allocate or post receive buffers 40. In the example of FIG. 2, buffer B1 holds the first arriving message M(2), buffer B2 holds the second arriving message M(1) and buffer B3 holds the third arriving message M(3). In this example, message M(2) has arrived before message M(1). However, to properly order the messages, receive message processing 42 can simply remove message M(1) from its buffer first (thereby reordering the messages) and can then pass the messages in their proper order to receive processing 44 (e.g., the application software executing at the destination node).

Those skilled in the art will understand that message ordering in a system can be imposed by using a particular protocol, e.g., messages sent from a particular source to a particular destination may be sequentially numbered and the sequential numbers can be transmitted with the messages so that the destination node can properly reorder the messages.

The process of allocating or posting receive buffers 40 in destination node $18_j$ is often a dynamic one, and if more messages are arriving than there are buffers posted, buffer overrun can occur. To avoid buffer overrun at the destination node, it is common to 1) adopt a convention wherein the destination node automatically discards packets assuming that the source node will retransmit them after a timeout, or 2) adopt a rendezvous protocol when the message lengths are larger than some threshold. A rendezvous protocol, as discussed further below, involves the transmission from the source node of a control information packet relating to a message to be sent from the source node to the destination node. The control information often includes an indication of the length of the entire data portion of the message to be sent. When a buffer of adequate length is allocated or posted at the destination node, an acknowledgement packet transmission (e.g., "READY TO RECEIVE") is sent from the destination node to the source node, and the source node can thereafter reliably send the entire message to the destination node. In conventional rendezvous protocols, this initial exchange of the control information and acknowledgement packets results in a loss of performance for messages longer than the threshold because two packets are now required to be exchanged between the source and destination nodes before any actual message data can be exchanged.

What is required, therefore, is a method, system, and associated program code and data structures, which prevent the performance degradation associated with packet retransmission after timeouts, or with standard rendezvous protocols in which an exchange of packets between source and destination nodes occurs before any actual message data is exchanged.

SUMMARY OF THE INVENTION

The shortcomings of the prior approaches are overcome by the present invention, which relates to methods, systems, protocols and buffering for facilitating the efficient transmission of messages from a source node to a destination node in a message processing system. An optimistic, eager rendezvous transmission mode is disclosed wherein first data portions of messages are transmitted from a source node to a destination node along with the initial control information packets. By employing early arrival buffering at the destination node, the source node can reliably send the first data portions of the messages to the destination node along with the control information, knowing that the first data portions will be reliably stored in either early arrival buffering or posted receive buffering.

In one particular aspect, the present invention is a method for transmitting at least one message from a source node to a destination node, the message including a first data portion and a second data portion. The method includes providing, at the destination node, first, early arrival buffering to reliably store the first data portion of the message. The first data portion of the message is transmitted, along with control information relating to the first message, from the source node to the destination node. The destination node stores the first data portion of the message in the provided early arrival buffering, and the source node thereafter waits for an acknowledgement pertaining to the first message from the destination node before transmitting any remaining data portions of the first message.

The destination node determines whether it can receive the remaining data portions of the first message, e.g., whether adequate receive buffering is posted, in response to receiving the control information relating to the first message. In response to an eventual determination that the destination node can receive the remaining data portions of the first message, the destination node transmits the acknowledgement pertaining to the first message to the source node, and the source node transmits the second data portion of the first message in response to receiving the acknowledgement.

In another aspect, the present invention provides a combined rendezvous mode message transmission method for a message processing system, including alternating between rendezvous transmission modes as a function of the amount of free space in the early arrival buffering. In this aspect of the invention, a method for transmitting a plurality of messages from a source node to a destination node is provided, including providing, at the destination node, early arrival buffering of adequate size to hold respective first data portions of a given number "Q" of the plurality of messages. The method further includes alternating between using a first rendezvous transmission mode and a second rendezvous transmission mode as a function of the amount of free space in the early arrival buffering, wherein:

the first rendezvous transmission mode comprises transmitting first data portions and control information for respective first mode messages of the plurality of messages, and awaiting respective acknowledgements before sending any remaining data portions of the first mode messages, and the second rendezvous transmission mode comprises transmitting control information for respective second mode messages of the plurality of messages, and awaiting respective acknowledgements before sending any respective data portions of the second mode messages.

The first rendezvous transmission mode is used when there is a sufficient amount of free space in the early arrival buffering to hold first data portions of the messages to be transmitted. The second rendezvous transmission mode is used when there is an insufficient amount of free space in the early arrival buffering to hold the first data portions of the messages to be transmitted.

The amount of free space in the buffering is determined at the source node based on the given number "Q" of the plurality of messages for which adequate space is provided at the destination node, and the number of first mode messages for which first data portions and control information have been transmitted and for which acknowledgements have not been received from the destination node.

In an enhanced embodiment, the system may include a plurality of message destination nodes, and the source node independently alternates between using the first rendezvous transmission mode and the second rendezvous transmission mode for each destination node of any of the plurality of the message destination nodes to which messages are transmitted from the source node, as a function of the amount of buffering currently available at each destination node.

The invention also includes a memory including the early arrival buffer structure to reliably hold the first data portions of the messages, and also includes a system having the processing resources at the source node and the destination node, including receive message processing resources and the pre-allocated early arrival buffer buffering at the destination node, to implement the transmission modes discussed above.

The optimistic eager rendezvous transmission mode of the present invention is recommended for systems that can operate under the general assumption that receive buffering is usually posted at the message destination node, and therefore, when employed, avoids the delays associated with message packet retransmission after time-outs, or the initial exchange of dataless transmissions characteristic of standard rendezvous modes. The enhanced, combined transmission mode, provides the above-described advantages of the eager rendezvous mode but also allows for a reasonable limit to be imposed on the amount of early arrival buffering in the system.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Figure 1:
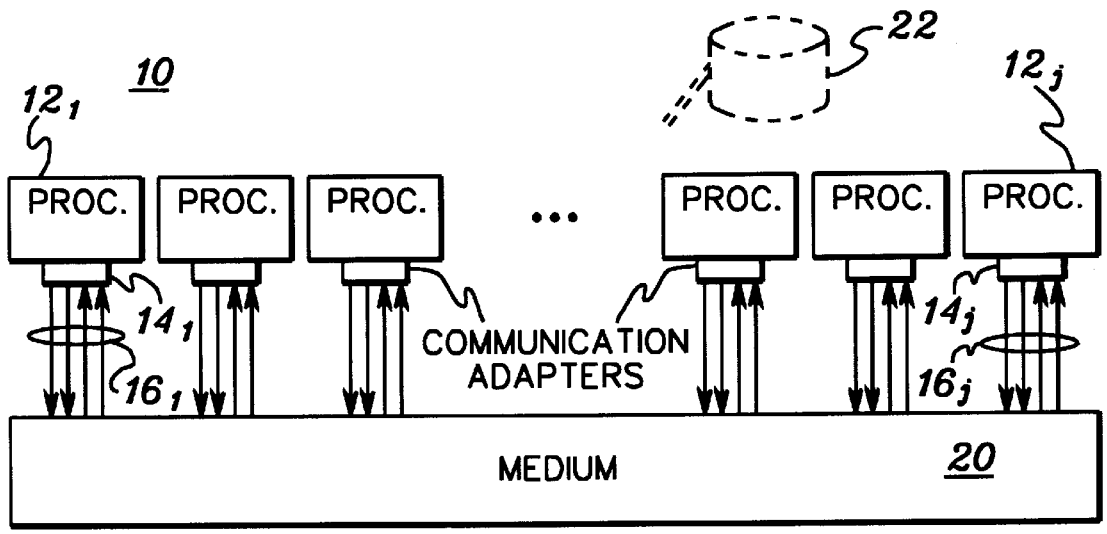
FIG. 1 is an exemplary message processing system in the form of a multiprocessor data processing system having a plurality of processors coupled by a communication medium.

As discussed above, FIG. 1 depicts an exemplary message processing system in the form of a mutiprocessor data processing system 10 having a plurality of processors $12_1 \ldots 12_j$. Each processor has a respective communication adapter 14 for operating its respective connection 16 to a commonly connected medium or switch network 20. A storage medium 22 may also be provided in the system to hold and/or support application software and all relevant data structures, protocols, etc.

Figure 2:
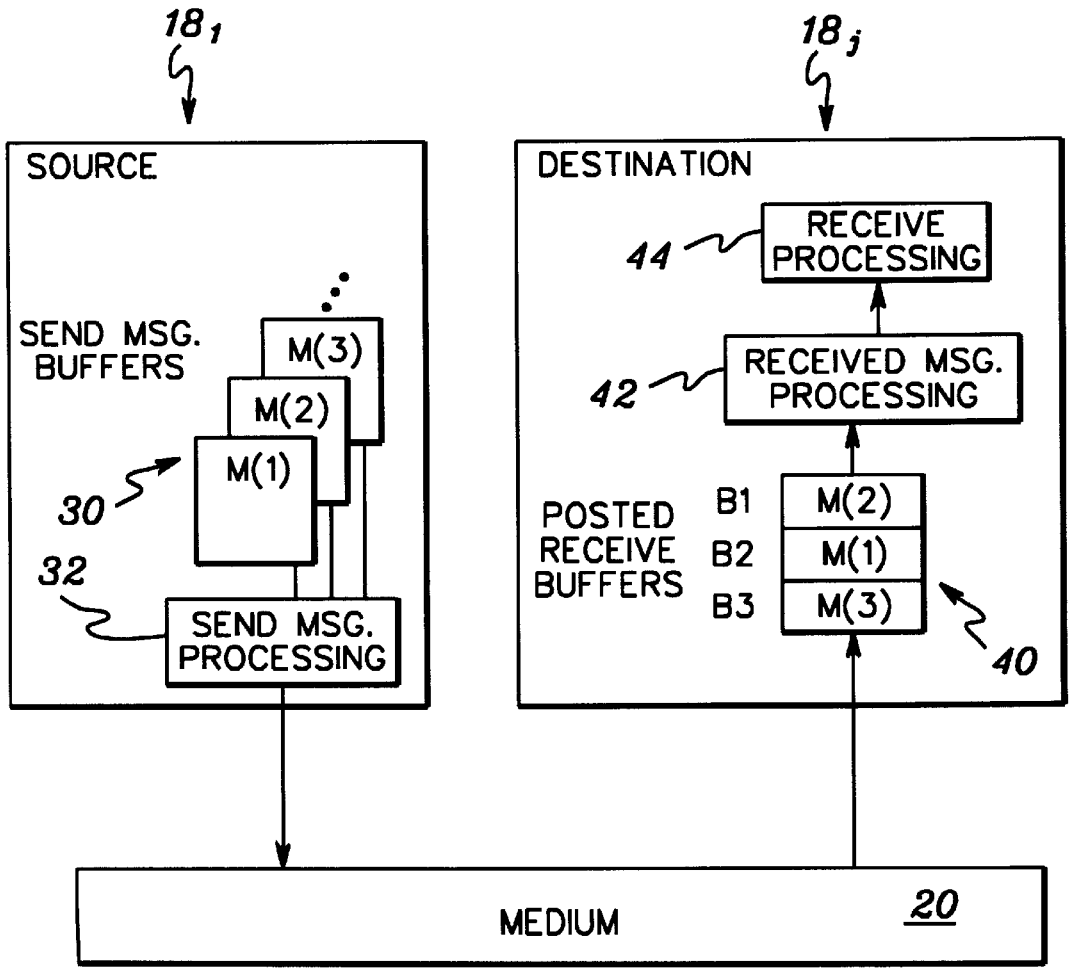
FIG. 2 is a hybrid hardware/software diagram of a message processing system having message source and destination nodes, and receive buffering for out of order message reception at the destination node.

FIG. 2 is a hybrid hardware/software diagram of a generalized message processing system having a message source node $18_1$ and a message destination node $18_j$. The term "node" is used broadly herein to connote any identifiable combination of hardware and/or software to or from which messages are passed.

It is assumed hereafter for illustrative simplicity that the application running on the message processing system requires messages 30 to be sent from the source node $18_1$ to the destination node $18_j$ via the medium 20. (However, all nodes in an actual system are expected, though not required, to contain both the message sending and receiving capabilities discussed herein, since each node would generally be expected to send and receive messages in accordance with the message transmission modes disclosed herein.)

Figure 3:
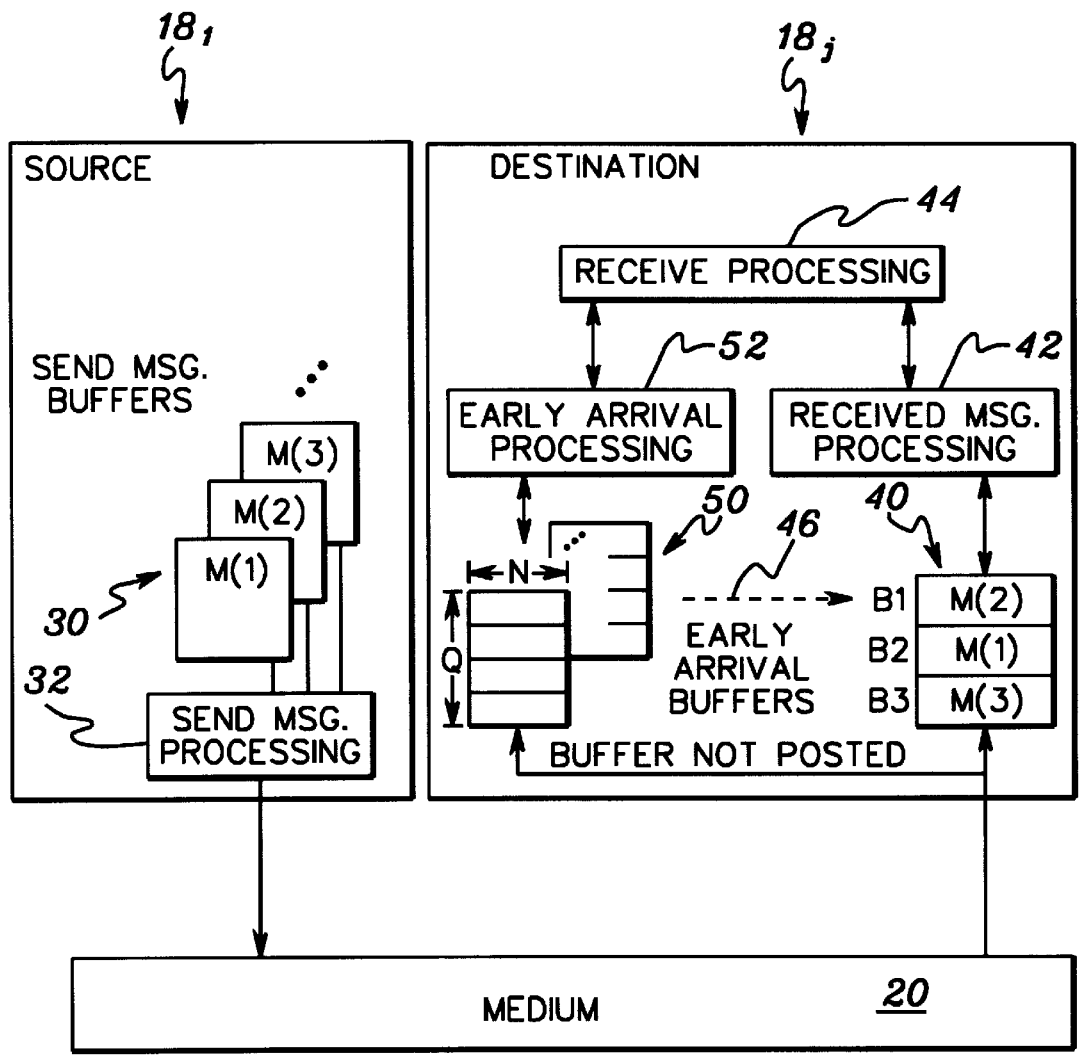
FIG. 3 is a hybrid hardware/software diagram of a message processing system having message source and destination nodes, the message destination node including early arrival buffering and early arrival processing for receiving message data portions when receive buffers have not yet been posted, in accordance with the present invention.

In accordance with the present invention, as illustrated in FIG. 3, the software and/or hardware of destination node $18_j$ includes early arrival processing resources 52 and pre-allocated, early arrival buffering 50 of sufficient size to accommodate length "N" data portions of a predetermined number "Q" of the messages from each of "j–1" potential message source nodes which may require receipt at the destination node.

As discussed above, in a standard rendezvous transmission mode, it is expected that the first transmission from the source node to the destination node include only control information, which allows the destination node to determine if and when buffers 40 will be available. If, based on this control information, buffers are not available, the destination node refrains from sending an acknowledgement, and the source node refrains from sending any data portions of the message until the acknowledgement is received. When adequate receive buffering is posted at the destination node, an acknowledgement is sent and the source node can then reliably initiate transmission of the data portions of the message.

However, in accordance with the present invention, and as illustrated in FIG. 3, a predetermined number "Q" of early arrival buffer slots, each of length "N," are provided at the destination node for each of "j–1" potential message source nodes so that at least a portion of the data of at least some of the messages 30 can be accommodated at the destination node along with the initial control information. Relying on the presence of the receive buffering, or in the alternative the early arrival buffering 50 at the destination node, the source node, in an "eager" rendezvous mode, can reliably send at least some data portions of at least some of the messages 30 with the respective initial transmissions of control information. (If the overall message size is smaller than "N," the entire message is transmitted.) When the destination is ready, e.g., adequate receive buffering is posted for the entirety of the message, the destination node copies 46 the data from the early arrival buffering to the posted receive buffering, sends a respective acknowledgement to the source node, and the source node can at that time send remaining portions of the data of the respective, now acknowledged messages. In the case of small messages "MS(i)" of size less than N, i.e., those that fit into a single data portion (frame), the acknowledgement shall not be understood as direction to continue sending data (since all data was sent in MS(i)), nor as an indication that the source sending MS(i) has to wait, but rather that an early arrival buffer has become free (see discussions below regarding how the acknowledgements are used herein to indicate the freeing of early arrival buffer space).

For these small messages, since acknowledgements are costly to send, the acknowledgements for multiple such small messages can be grouped together, and sent as a single packet, possibly combined with other control information. If the destination withholds these acknowledgements for too long, however, the source may revert to standard rendezvous, as discussed below in connection with FIG. 6. One possibility is to impose a high-water mark at the destination to ensure that the source does not mistakenly assume that early arrival buffering is filled, when in fact it is free, but the destination is intentionally withholding acknowledgements. When the high-water mark is reached, the grouped acknowledgements would then be sent, thus indicating to the source the correct status of the early arrival buffering. Also, explicit acknowledgements may not be necessary for each message, since the number of such messages can be returned by the destination (if a certain high-water mark has been reached) and this number suffices as the acknowledgement for each message.

The length "N" of the first data portion of the message transmitted is a predetermined number which should correspond to the size "N" of the early arrival buffer slot pre-allocated at the destination node for each message of a number "Q" of messages. If "N" is large enough so that the destination node receives the control information in the initial transmission and returns the rendezvous acknowledgement before all "N" bytes have been sent by the source node, then the source node does not experience any interruption in the data transmission and the destination, likewise, does not see any interruption in the data received. This eager rendezvous transmission mode does not require a large amount of buffering at the destination for these initial transmissions since each such early arrival transmission only brings with it, at most, "N" bytes of the data portion of the message.

The early arrival buffering may be a "flat" buffer, possibly from a buffer pool, or can be implemented using pointers and/or linked lists.

Figure 4:
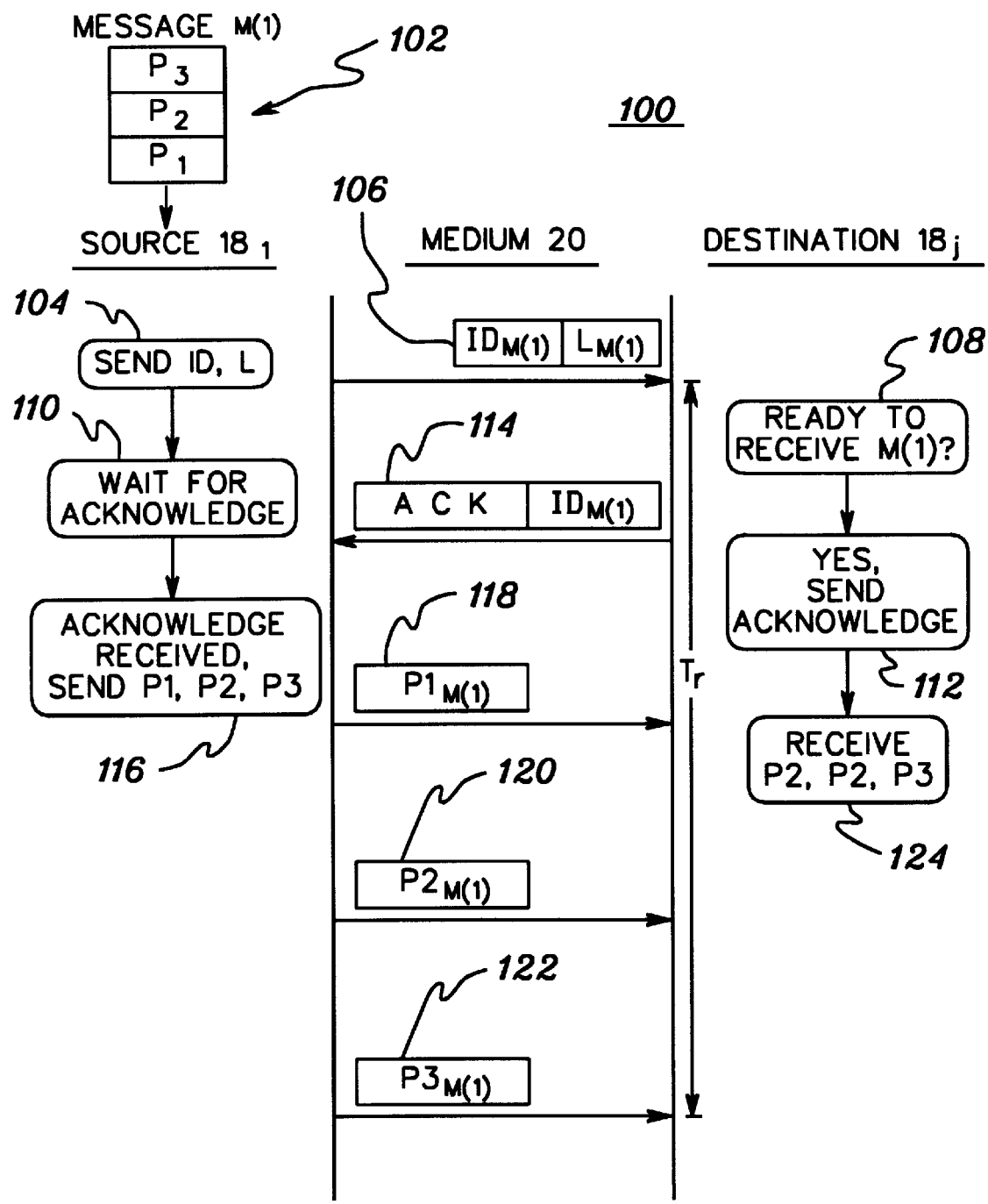
FIG. 4 is protocol diagram of a first rendezvous transmission mode in which message transmission is initiated using a packet for control information only, with any remaining data portions of the message being transmitted following an acknowledgement from the destination node.
Figure 5:
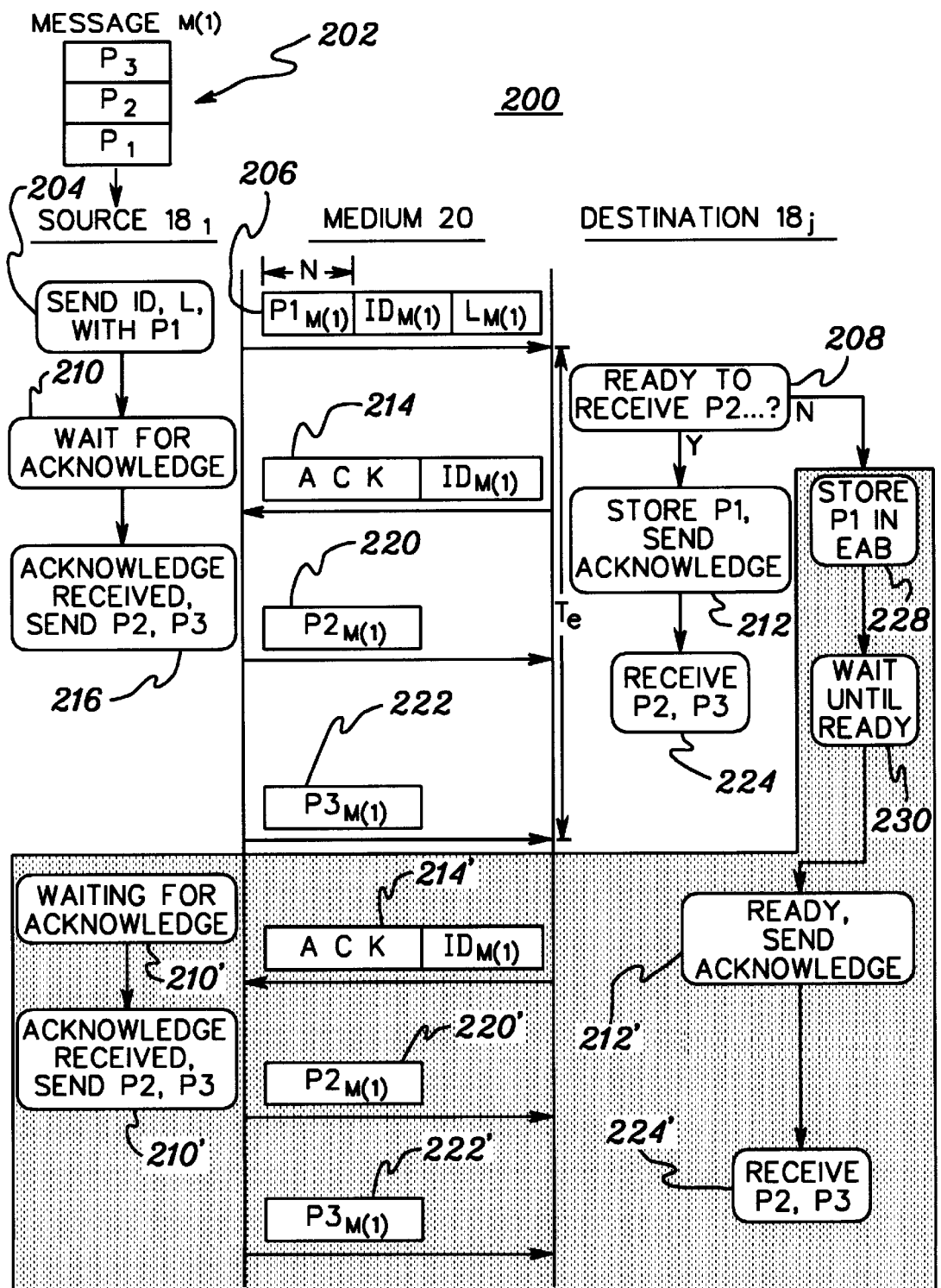
FIG. 5 is a protocol diagram of a second, eager rendezvous transmission mode in which message transmission is initiated using a packet having both control information and a data portion of the message, with any remaining data portions of the message being transmitted following an acknowledgement from the destination node, in accordance with the present invention.
Figure 6:
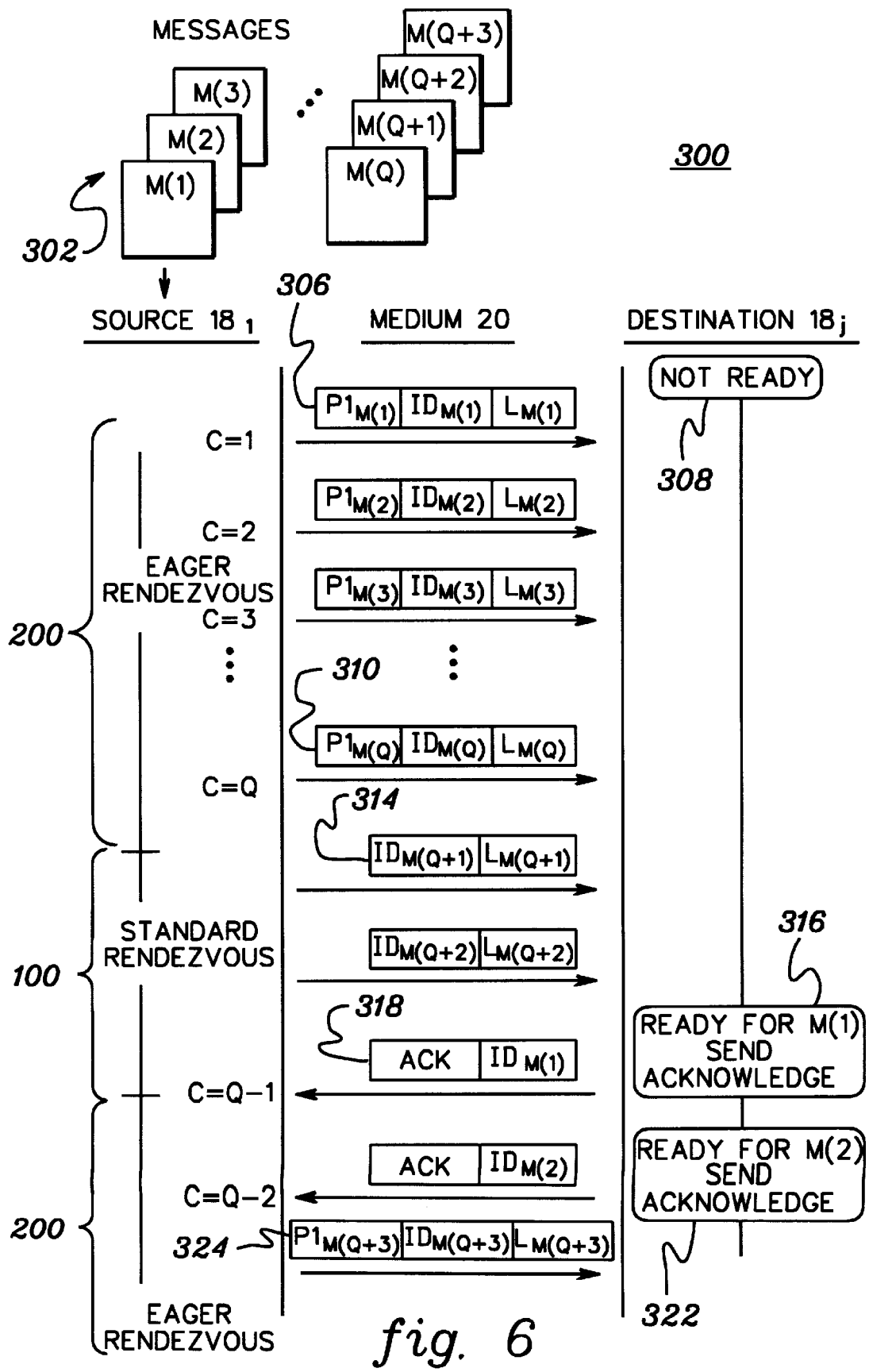
FIG. 6 is a protocol diagram of a third transmission mode which alternates between the two rendezvous transmission modes of FIG. 4 and FIG. 5 as a function of the amount of space remaining in the early arrival buffer at the destination node, as indicated by the absence of acknowledgements from the destination node, in accordance with the present invention.

Having described the background of message processing systems, and the general make-up of the source and destination nodes in a message processing system, attention is now turned to the protocol diagrams of FIGS. 4–6 which describe, in detail, the processing occurring in both the source and destination nodes, and the contents of the transmissions therebetween, in accordance with the principles of the present invention.

With reference to the protocol diagram of FIG. 4, shown therein is a first rendezvous transmission mode 100 for transmitting message M(1), 102 between source node $18_1$, and destination node $18_j$ via medium 20. Message M(1) 102 is assumed to have multiple data portions, i.e., P1, P2 and P3. Upon a determination in source node $18_j$ to send message M(1), step 104, "SEND ID, L" occurs in which initial packet 106 is transmitted from the source node to the destination node. The packet includes control information, for example, $ID_{M(1)}$ and $L_{M(1)}$. As discussed above, the messages may be assigned sequential identification numbers "ID", and the length "L" of the overall message comprising its portions is generally known. In mode 100, only this control information is initially sent from the source to the destination. (In mode 100, and the modes discussed below in connection with FIGS. 5 and 6, the destination always guarantees sufficient space for control information, since its size is negligible.) In response to receiving this information at the destination, inquiry 108, "READY TO RECEIVE M(1)?" occurs, during which a determination is made whether, for example, adequate receive buffering is available at the destination to receive message M(1) having length $L_{M(1)}$. Upon a determination that the destination is ready, e.g., a receive buffer is posted, and step 112, "YES, SEND ACKNOWLEDGE" occurs and results in an acknowledgement packet 114 (noting $ID_{M(1)}$) being transmitted from the destination back to the source.

The source has refrained from sending any data portions of the message in step 110, "WAIT FOR ACKNOWLEDGE," in the absence of an acknowledgement. Following receipt of the acknowledgement, step 116 occurs in which the data portions P1, P2 and P3 are transmitted, in sequential packets 118, 120 and 122, from the source to the destination during which time the destination via step 124 is reliably receiving these packets.

This first rendezvous transmission mode 100 thus requires communication of an initial control information packet 106, followed by an acknowledge 114, followed by transmission of the actual data portions or frames of the message P1, P2 and P3. The total delay incurred between the transmission of the initial control information packet 106 and the receipt at the destination of the final message data packet 122 is noted as $T_r$ for this mode. (Those skilled in the art will recognize that communication delays are actually incurred in the medium as the packets are sent from the source to the destination, but these delays are not shown in FIG. 4. The delay associated with each packet transmission shown in FIG. 4 proportionately increases the overall transmission time, $T_r$.)

In this first rendezvous transmission mode 100, no data portions of the message are sent until an acknowledgement is received from the destination, based upon the previously transmitted control information, indicating that the destination is ready to receive the data portions of the message.

However, as discussed above with reference to FIG. 3, and in accordance with the present invention, early arrival buffers 50 can be employed at the destination node along with early arrival processing 52 such that early data portions of the messages can be accommodated at the destination node, in the event that the destination node is not ready to receive the message. The presence of the early arrival buffers at the destination node allows the source node to "eagerly" send a first data portion of the message, along with the initial control information, because the source node can assume that the first data portion of the message can be reliably stored at the destination node without regard to whether a receive buffer is posted for the entire message. The exemplary early arrival buffering 50 in FIG. 3 can accommodate first data portions of "N" bytes each for a given number of messages, "Q," to support this "eager" rendezvous mode.

With reference to the protocol diagram of FIG. 5, shown therein is this second, "eager," rendezvous transmission mode 200 used to transmit a message M(1), 202 comprising data portions P1, P2 and P3 from source $18_i$ to destination $18_j$, and which employs the early arrival buffering now available at the destination to store first, length "N" data portions of "Q" messages.

Upon a decision to transmit message M(1), step 204, "SEND ID, L WITH P1" occurs, resulting in an initial packet transmission 206 from the source to the destination. Unlike in FIG. 4, however, initial packet 206 includes message data portion $P1_{M(1)}$, having a predetermined length N, corresponding to the size of the early arrival buffer at the destination. Upon receipt of packet 206 at the destination, inquiry 208, "READY TO RECEIVE P2 . . . ?" occurs, within which the destination node determines whether, for example, adequate receive buffering exists to receive message M(1). If adequate receive buffering has been posted, step 212, "STORE P1, SEND ACKNOWLEDGE" occurs, resulting in $P1_{M(1)}$ being stored in the posted buffer and the transmission of an acknowledgement packet 214 back to the source node, which has in the meantime been waiting for the acknowledgement in step 210, and the storing of $P1_{M(1)}$ in the posted buffer. This allows a concurrent overlap of communication and P1 processing, which is not possible in standard rendezvous systems. Upon receipt of the acknowledgement, step 216 occurs and packets 220 and 222 are transmitted from the source to the destination containing the remaining two portions of the message, P2 and P3.

With further reference to FIG. 5, should the destination node not be ready, e.g., no receive buffer is posted to receive the remaining portions P2 . . . , the "early arrival" processing steps and transmissions noted in the shaded box 250 occur. The destination node stores P1 in the early arrival buffer ("EAB"), 228, and waits until it is ready 230. When ready, 212'(e.g., receive buffer posted) the destination sends acknowledgement 214' back to the source which had been waiting 210' for the acknowledgement, before sending portions P2 and P3. (The first data portion residing in the early arrival buffering can then be moved (FIG. 3, path 46) from its slot into the now posted receive buffer, thereby freeing up space in the early arrival buffering.) Upon receipt of the acknowledgement, the portions P2 and P3 are sent, 216', in packets 220' and 222', and are received 224' by the destination into the now posted buffer.

The mode 200 of FIG. 4 can be concurrently executed for each of a potential number "j–1" of source nodes.

Using this optimistic protocol, the source node has assumed that adequate receive or early arrival buffering is available at the destination node for at least the first length "N" portion P1 of message M(1). If a receive buffer has already been posted for the entire message, the overall transmission time required to transmit the entirety of message M(1) is $T_e$. Transmission time $T_e$ is therefore less than the transmission time $T_r$ associated with the rendezvous transmission mode 100 of FIG. 4. Only four, rather than five packet transmissions have occurred across the medium to transmit the entirety of message M(1). Further, the additive effect of any transmission delays is decreased because of the decreased number of transmissions and the overlap of communicating the acknowledge with $P1_{M(1)}$ processing.

To expand on this advantage, assume that the total time T__t required to send a message of size L is represented by the following equation:

$$T\_t = T\_l + (L/BW) \qquad \text{Eq. (1)}$$

where T__l=the latency (i.e., the time to send a 0 byte message (tiny packet) from one node to another node); and BW=the bandwidth (i.e., the maximum number of bytes that can be sent from one node to another per second).

In standard rendezvous, there is an extra round trip (2×T_1) for two control packets containing control information (106 and 114 in FIG. 4) before any message data can be transmitted. Therefore, in a standard rendezvous protocol, the total time T_tr is:

$$T\_tr = 2 \times T\_1 + T\_t \qquad \text{Eq. (2)}$$

The eager rendezvous mechanism eliminates the extra round trip cost of standard rendezvous by encapsulating the control information in the first control packet along with the first portion or frame of the message (206 in FIG. 5) and the sending of the acknowledgement message (214 in FIG. 5) may be time-overlapped with receipt of the first frame of the message. This overlap occurs because the destination sends an acknowledgement as soon as it reads the control information and before completely reading the first packet (assuming that the appropriate receive buffer was already posted). The encapsulation of the control information in 206 and the overlap of the second packet 214 with the receipt of 206 at destination $18_j$ completely hides the cost of the round trip of control messages in the standard rendezvous (as shown in Equation 2).

Those skilled in the art will recognize that the source node WAIT steps 110, 210 and 210' of FIGS. 4 and 5 connote waiting for the acknowledgement for the particular message for which control information has been previously sent. The source node can proceed with other tasks during this wait, and is merely refraining from sending additional data portions of the message for which an acknowledgement has not yet been received. Those skilled in the art will further recognize that the use of the term "acknowledge" or "acknowledgement" should be construed broadly herein to connote what is known in the rendezvous transmission art as the "READY TO RECEIVE" message which conveys the information from the destination to the source that the destination is now ready to receive further information and/or data in association with a message for which it had previously received control information. In the case of messages MS(i) of length<N, acknowledgement should be understood as an indication that an early arrival buffer has freed up, as all data pertaining to this message was sent with the first portion of the message. Those skilled in the art will further recognize that the packets of FIGS. 4–6 herein may include other facilitating control information, e.g., intramessage packet ordering information, and low-level flow control acknowledgements, and no limitation should be inferred from the absence of any such control information from these figures.

An optimization can be realized in accordance with the present invention by selectively alternating between the rendezvous transmission modes of FIGS. 4 and 5, under the assumption that only a finite and predetermined number of early arrival buffer slots "Q" can be maintained on any given destination node. In this situation, each source node maintains a count "C" of the number of unacknowledged initial eager rendezvous packets that it has sent to each destination. If C is less than Q for a respective destination, the source operates in an eager rendezvous mode for that destination, i.e., the rendezvous transmission mode 200 depicted in FIG. 5. If C is equal to or greater than Q, the source node operates in the rendezvous transmission mode 100 of FIG. 4.

Using this technique of selectively alternating between rendezvous transmission modes, the per-node early arrival buffering can be constrained to Q×N×the number "j−1" of potential source nodes in the system. This is largely independent of the actual sizes of the messages transmitted in the system. Further, the performance degradation associated with the rendezvous mode 100 of FIG. 4 only occurs for applications that attempt to exceed the out of order receipt of messages by more than Q. As those skilled in the art will recognize, mode 100 will only be rarely invoked. Applications which are well behaved, i.e., those that receive messages either in order or with a limited amount of out of ordering, will experience no drop in performance, since those applications will usually not fill the early arrival buffering space, and will therefore primarily utilize the eager rendezvous transmission mode 200 of FIG. 5.

FIG. 6, illustrates a scenario wherein a combined transmission mode 300 comprises, for example, alternating between eager rendezvous 200 and rendezvous mode 100, as a function of the count C of unacknowledged initial eager rendezvous packets which the source node $18_1$ has sent to the destination node $18_j$. Combined mode 300 assumes that a plurality of messages 302 require transmission from source $18_1$ to destination $18_j$. During eager rendezvous mode 200, eager rendezvous initial packets are transmitted, for example, "first mode" packets 306 and 310, which each contain a first portion of the data of each of the respective messages M(1), M(2), M(3) ... M(Q). These respective first data portions of the messages are sent along with the control information including $ID_M$ and $L_M$ for each respective message M(1), M(2), M(3) ... M(Q). Count C is incremented as these messages are sent. During this time, the destination node is assumed to be not ready 308, e.g., has not posted any receive buffers for any of M(1) ... M(Q). Packet 310, including the first data portion $P1_{M(Q)}$ of message M(Q) will entirely fill the destination node's early arrival buffering, which only has Q slots available.

In the absence of any acknowledgement packets from the destination, the source will switch to rendezvous transmission mode 100 wherein only control information is sent in the initial packets, e.g., "second mode" packet 314, which includes $ID_{M(Q+1)}$ and $L_{M(Q+1)}$. Source $18_1$ will remain in rendezvous transmission mode 100 until acknowledgements are received from the destination node, as the destination has posted buffer(s), empties early arrival buffer slot(s), and therefore becomes ready for any remaining data portions of the messages. For example, steps 316 and 322 result in acknowledgements (e.g., 318) being sent back from the destination to the source, indicating that the destination is now ready to receive any remaining data portions of the respective messages M(1) and M(2) (and implying that the early arrival slots initially occupied by M(1) and M(2) have been freed by copying the data to the actual receive buffers from these messages (i.e., 46 in FIG. 3)). At this time, the source can safely revert back to eager rendezvous mode 200 since count C has now been decremented below Q as these acknowledgements are received. For the next message M(Q+3), "first mode" packet 324 is transmitted, which includes control information and data portion $P1_{M(Q+3)}$ destined for freed early arrival buffering, and in accordance with the eager rendezvous transmission mode 200 of FIG. 5.

The reversion back to eager rendezvous mode 200 was triggered by the acknowledgement packets sent from the destination back to the source for early arrival messages. These acknowledgements were triggered by the destination being ready, e.g., posting buffers in steps 316 and 322 for messages for which eager rendezvous packets had been previously transmitted. During this posting process, the first data portions residing in the early arrival buffering can be moved from their slots into the posted buffers, thereby freeing up slots in the early arrival buffering. Therefore, packet 324 can be reliably sent from the source node to the destination node knowing that early arrival buffering space is available for at least the first portion $P1_{M(Q+3)}$ of the next message M(Q+3).

In accordance with the out of order receipt principles discussed above, it is possible that the destination may become ready for M(Q+1) before it becomes ready for M(1) 316. An acknowledgement for M(Q+1) would then be sent form the source to the destination, yet because M(Q+1) was not an "early arrival message," and no space was freed in the early arrival buffering, the system remains in standard rendezvous mode 100. Further, it is possible that the destination becomes ready for M(Q+2) after ready for M(1) 316 but before ready for M(2) 322. However, despite an acknowledgement sent from the destination to the source for M(Q+2), the count C will remain at Q−1 since, again, M(Q+2) was not an "early arrival message" and no space was freed in the early arrival buffering.

The transmissions of any remaining data portions of the messages in FIG. 6, from the source node to the destination node are assumed (and can occur at any time), but have been omitted from this figure for clarity.

The principles of transmission mode 300 of FIG. 6 can be applied across a system having multiple source and destination nodes. Each source node maintains the count C of each of the unacknowledged initial eager rendezvous transmissions sent to each respective destination node, and alternates between the rendezvous transmission modes 100 and 200 on a per destination node basis, depending upon the count C for each respective destination node.

The optimistic eager rendezvous transmission mode 200 of the present invention is recommended for systems that can operate under the general assumption that receive buffering is usually posted at the message destination node, and when employed, avoids the delays associated with the initial exchange of dataless transmissions characteristic of standard rendezvous modes. Further, the enhanced, combined transmission mode 300 provides the above-described advantage of eager rendezvous, but also allows a reasonable limit to be imposed upon the amount of early arrival buffering in the system.

The present invention can be included in an article of manufacture (for example, one or more computer program products) having, for example, computer usable media such as the media 22 of FIG. 1 or the memory/data structures of FIGS. 2–3. The media has embodied therein, for example, computer readable program code means for providing and facilitating the mechanisms of the present invention. The article of manufacture can be included as part of a system or sold separately. Whether in the above-described article of manufacture, or within other memory components, the present invention also includes the formatted message, buffer, command and any other data structures discussed above which also facilitate the mechanisms of the present invention.

While the invention has been particularly shown and described with reference to preferred embodiment(s) thereof, it will be understood by those skilled in the art that various changes in form and details may be made therein without departing from the spirit and scope of the invention.

What is claimed is:

1. A message processing system, comprising:

a source node having processing resources therein to separately transmit multiple data portions of a message over a medium coupled thereto;

a destination node having processing resources therein for receiving the multiple portions of the message from the medium, including:

a received message processing resource for dynamically posting a receive buffer to receive the multiple data portions of the message, and a pre-allocated early arrival buffer of sufficient size to hold at least the first data portion of said multiple data portions of the message, such that the source node can reliably transmit the first data portion of the message to the destination node before the receive buffer is posted.

2. The message processing system of claim 1, further comprising:

the medium coupled between the source node and the destination node.

3. A multiprocessor data processing system having multiple processing nodes and including the message processing system of claim 2, a first processing node of the multiple processing nodes comprising the source node, a second processing node of the multiple processing nodes comprising the destination node.

4. The message processing system of claim 1, wherein control information is transmitted with said first data portion of said message but not with subsequently transmitted data portions of said message.

5. A system for transmitting at least one message from a source node to a destination node in a message processing system, the at least one message including a first message comprising a first data portion and a second data portion, the system comprising:

means for providing, at the destination node, first buffering to reliably store the first data portion of the first message;

means for transmitting the first data portion of the first message, and control information relating to the first message, from the source node to the destination node;

means for storing the first data portion of the first message in the provided first buffering at the destination node; and means, in the source node, for waiting for an acknowledgement pertaining to the first message from the destination node before transmitting the second data portion of the first message.

6. The system of claim 5, further comprising:

means, in the destination node, for determining whether the destination node can receive the second data portion of the first message in response to receiving the control information relating to the first message; and means for, in response to a determination by said means for determining that the destination node can receive the second data portion of the first message:

the destination node transmitting the acknowledgement pertaining to the first message to the source node, and the source node transmitting the second data portion of the first message in response to receiving the acknowledgement pertaining to the first message.

7. The system of claim 6, further comprising:

means for, in response to a determination by said means for determining that the destination node cannot immediately receive the second data portion of the first message:

the destination node waiting until the destination node can receive the second data portion of the first message, the destination node transmitting, to the source node, the acknowledgement pertaining to the first message when it can receive the second data portion of the first message, and the source node transmitting the second data portion of the first message in response to receiving the acknowledgement pertaining to the first message.

8. The system of claim 5, wherein the at least one message comprises a second message, and a plurality of messages including the first message, wherein:

said means for providing includes means for providing buffering at the destination node including said first buffering, to reliably store first data portions of respective ones of the plurality of messages, including the first data portion of the first message; and said means for transmitting includes means for transmitting, in a first rendezvous transmission mode, the first data portions of the respective ones of the plurality of messages, and respective control information relating to the respective ones of the plurality of messages, from the source node to the destination node;

said system further comprising:

means for, in response to the buffering being filled by said first portions of the respective ones of the plurality of messages, the source mode transmitting, in a second rendezvous transmission mode, control information relating to the second message without any data portions of the second message, and waiting for an acknowledgement pertaining to the second message from the destination node before transmitting any data portions of the second message.

9. The system of claim 8, further comprising:

means for, in response to a portion of the buffering being freed at the destination node, the source node thereafter using the first rendezvous transmission mode wherein first data portions and control information of respective next messages are transmitted from the source node to the destination node in anticipation of return acknowledgements, and in response to which acknowledgements any remaining data portions of the respective next messages are transmitted from the source node to the destination node.

10. The system of claim 9, further comprising:

means, in the destination node, for freeing the portion of the buffering, the portion of the buffering previously allocated to a first portion of a given message of the respective ones of the plurality of messages; and means, in the destination node, for transmitting an acknowledgement pertaining to the given message to the source node.

11. The system of claim 10, further comprising:

means, in the source node, for determining that the freed portion of the buffering has been freed at the destination node by processing the acknowledgement pertaining to the given message; and means, in the source node, for transmitting any remaining data portions of the given message to the destination node in response to the acknowledgement pertaining to the given message.

12. The system of claim 8, wherein the means for message processing system includes a plurality of message destination nodes, including the destination node, the system further comprising:

means for the source node alternating between said first rendezvous mode and said second rendezvous mode independently for each destination node of said plurality of message destination nodes to which messages are transmitted from the source node, as a function of the amount of buffering currently available in said each destination node.

13. The system of claim 5, wherein the message processing system comprises a multiprocessor data processing system, the source node and the destination node comprising processing nodes in said data processing system coupled by a medium through which the at least one message is transmitted.

14. The message processing system of claim 5, wherein the means for transmitting transmits said second data portion of said message as well as any subsequent data portions of said message without control information.

15. A system for transmitting a plurality of messages from a source node to a destination node in a message processing system, comprising:

means for providing, at the destination node, buffering of adequate size to hold respective first data portions of a given number "Q" of said plurality of messages; and means for alternating between using a first rendezvous transmission mode and a second rendezvous transmission mode as a function of the amount of free space in said buffering, wherein:

said first rendezvous mode comprises transmitting first data portions and control information for respective first mode messages of the plurality of messages, and awaiting respective acknowledgements before sending any respective remaining data portions of the first mode messages, and said second rendezvous mode comprises transmitting control information for respective second mode messages of the plurality of messages, and awaiting respective acknowledgements before sending any respective data portions of the second mode messages.

16. The system of claim 15, wherein the means for alternating between using includes:

means for using the first rendezvous transmission mode when there is a sufficient amount of free space in the buffering to hold first data portions of messages to be transmitted; and means for using the second rendezvous transmission mode when there is an insufficient amount of free space in the buffering to hold first data portions of messages to be transmitted.

17. The system of claim 16, wherein the means for alternating using includes:

means for determining, at the source node, the amount of free space in said buffering based on the given number "Q" of said plurality of messages for which adequate space is provided at the destination node, and the number of first mode messages for which first data portions and control information have been transmitted and for which acknowledgements have not yet been received from the destination node.

18. The system of claim 15, wherein the message processing system comprises a plurality of message destination nodes, including the destination node, the system further comprising:

means for the source node independently alternating between using the first rendezvous transmission mode and the second rendezvous transmission mode for each destination node of any of the plurality of message destination nodes to which messages are transmitted from the source node, as a function of the amount of buffering currently available in said each destination node.

19. The system of claim 15, wherein the message processing system comprises a multiprocessor data processing system, the source node and the destination node comprising processing nodes in said data processing system coupled by a medium through which the at least one message is transmitted.

20. A memory for storing data structures for access by an application being executed on a message destination node in a message processing system wherein a plurality of messages are transmitted from a message source node to the message destination node, the plurality of messages having respective first data portions transmitted from the message source node to the message destination node followed respectively, and only upon respective responsive acknowledgements from the message destination node that adequate receive buffering space is available therein for any respective remaining data portions thereof, by the any respective remaining data portions of the plurality of messages, the memory comprising:

an early arrival buffer to reliably hold the respective first data portion of at least one of the plurality of messages when adequate receive buffering is not available for the respective first data portions and any respective remaining data portions of the at least one of the plurality of messages, such that the source node can thereafter avoid transmitting the respective first data portions of the at least one of the plurality of messages to the destination node when adequate receive buffering is available therein for any respective remaining data portions of the at least one of the plurality of messages.

21. The message processing system of claim 20, wherein control information is transmitted with said first data portion of said at least one of the plurality of messages and said respective remaining data portions are transmitted without control information.

* * * * *